United States Patent

[11] 3,588,141

| [72] | Inventors | Soichiro Honda;<br>Hideo Masui, Tokyo, Japan |
| --- | --- | --- |
| [21] | Appl. No. | 802,891 |
| [22] | Filed | Feb. 27, 1969 |
| [45] | Patented | June 28, 1971 |
| [73] | Assignee | Honda Giken Kogyo Kabushki Kaisha<br>Tokyo, Japan |
| [32] | Priority | Feb. 29, 1968 |
| [33] | | Japan |
| [31] | | 43/15930 |

[54] APPARATUS FOR THE INDEPENDENT SUSPENSION OF THE WHEELS OF A MOTORCAR
7 Claims, 6 Drawing Figs.

| [52] | U.S. Cl. | 280/124, 267/19 |
| --- | --- | --- |
| [51] | Int. Cl. | B60g 3/06 |
| [50] | Field of Search | 280/124; 267/19 |

[56] References Cited
UNITED STATES PATENTS

| 2,279,008 | 4/1942 | Nathan | 280/124.1UX |
| --- | --- | --- | --- |
| 3,111,309 | 11/1963 | Andren | 280/124X |

FOREIGN PATENTS

| 1,004,229 | 9/1965 | Great Britain | 280/124 |
| --- | --- | --- | --- |
| 1,302,012 | 7/1962 | France | 267/19 |

*Primary Examiner*—Richard J. Johnson
*Attorney*—Waters, Roditi, Schwartz & Nissen ABSTRACT: Each wheel of a motorcar is attached to a supporting arm having a free end, remote from the wheel, pivotably connected to the body of the motorcar so that the wheel can move up and down, the supporting arm being attached to a set of longitudinal leaf springs proximate the wheel to cause the springs to flex as the wheel moves up and down. Each arm is connected to the associated set of leaf springs by a link member pivotably connected to the arm and the set of springs.

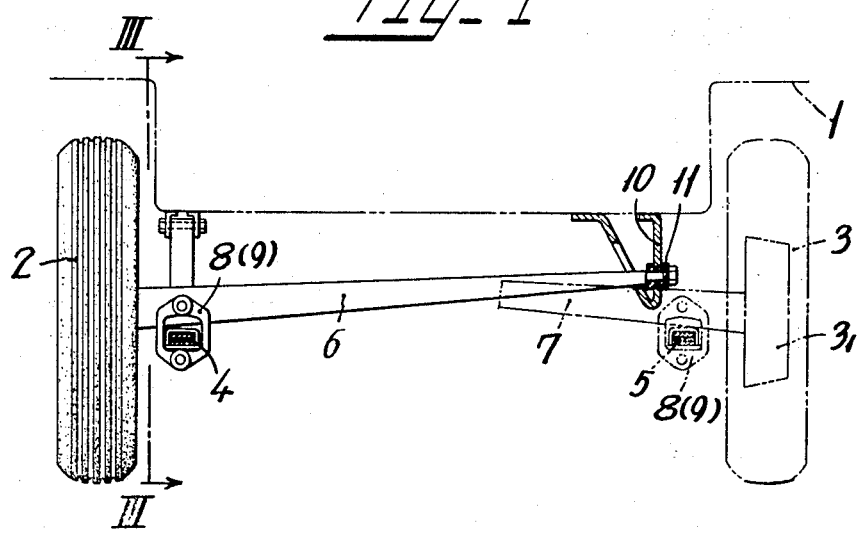
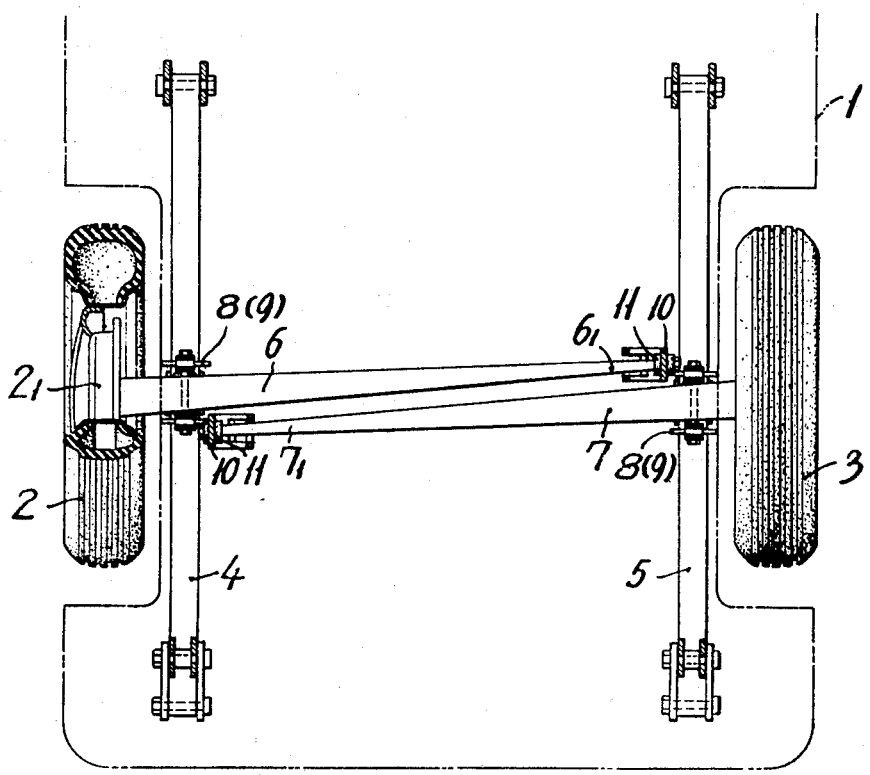

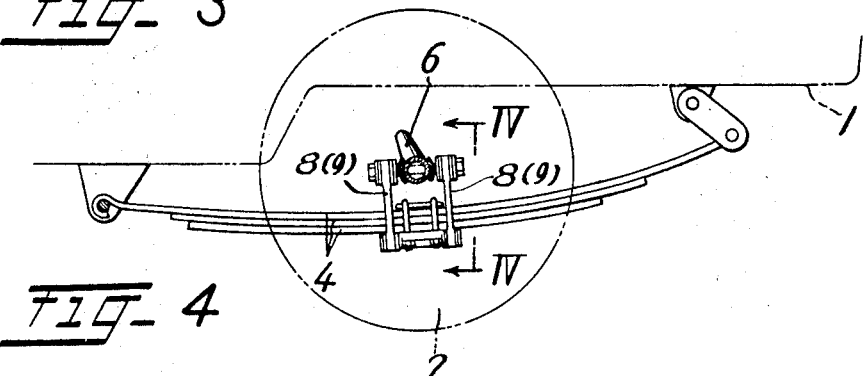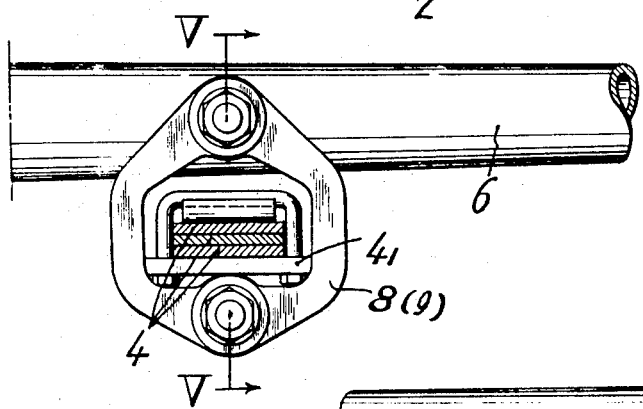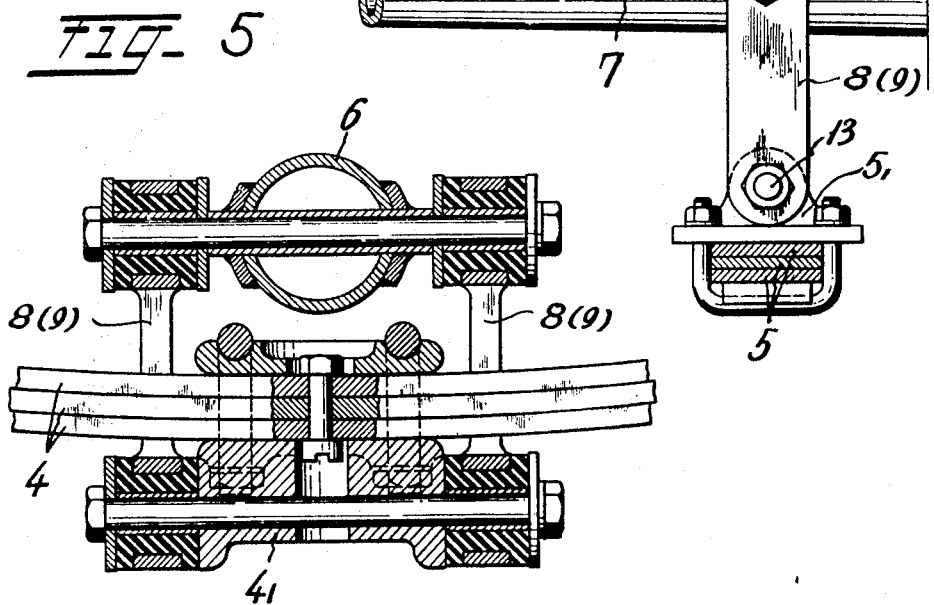

3,588,141

APPARATUS FOR THE INDEPENDENT SUSPENSION OF THE WHEELS OF A MOTORCAR

BRIEF SUMMARY OF THE INVENTION

This invention relates to apparatus for the independent suspension of a wheel in a motorcar and has for its object to simplify the construction thereof and cause its supporting spring means to operate smoothly.

In accordance with the invention there is provided a wheel supporting arm attached to each wheel and extending transversely of the vehicle body, each arm having an end, remote from its associated wheel, pivotably attached to the body such that the wheel is movable up and down, each said arm being coupled to a respective set of longitudinal leaf springs by means of a connecting link whereby as the wheel moves up and down the leaf springs are flexed thereby absorbing shock and tending to return the wheel to an initial position.

Each connecting link is pivotably connected to the associated arm and set of springs and it may be of annular form with the set of springs extending therethrough or it may be a flat strap.

BRIEF DESCRIPTION OF THE DRAWING

FIG. 1 is a front view, partly in section, of one embodiment of apparatus of this invention;

FIG. 2 is a top plan of the same;

FIG. 3 is a sectional view taken along the line III–III in FIG. 1;

FIG. 4 is an enlarged sectional view taken along the line IV–IV in FIG. 3;

FIG. 5 is a sectional view taken along the line V–V in FIG. 4; and

FIG. 6 is a front view of a modification of the portion shown in FIG. 4.

DETAILED DESCRIPTION

Referring to the drawing, numeral 1 denotes a car body, and numerals 2 and 3 denote right and left wheels, respectively.

Sets of layered leaf springs 4 and 5 are each attached at its opposite ends to the bottom surface of the car body 1 to extend in the longitudinal direction of the car body 1.

According to this invention, the wheels 2 and 3 are provided with respective wheel supporting arms 6 and 7, and these arms 6 and 7 are attached to their top ends $6_1$ and $7_1$ (their ends remote from the respective wheels) to the car body 1 so as to be swingable up and down. The arms 6, 7 are connected proximate the respective wheels to the corresponding leaf springs 4 and 5 through respective swingable links 8 and 9 which straddle the arms.

Numeral 10 denotes respective brackets for attaching the top ends $6_1$ and $7_1$ of the wheel supporting arms 6 and 7 to the car body 1, and numeral 11 denotes respective rubber seats each interposed in the mounting portion of the bracket 10 and the arm top end $6_1$ or $7_1$.

The links 8, 9 connecting the leaf springs 4, 5 and the swingable supporting arms 6, 7, may be in the form of a simple strap, as shown in FIG. 6, with the opposite ends thereof retained by pins 12 and 13. However, in this arrangement, if the spacing between the leaf springs 4, 5 and the swingable supporting arms 6, 7 is too great, the arrangement may become somewhat unstable and therefore it is preferable that the links 8, 9 each have an annular form, as shown in FIGS. 4 and 5, the corresponding leaf spring being arranged to pass through the center opening thereof. It is, further, preferable that fastening members $4_1$ and $5_1$ of the leaf springs 4 and 5 are used for attaching the leaf springs to the links 8 and 9.

As described above, the independent suspension apparatus of this invention is so constructed that the swingable supporting arms 6, 7 are connected to each set of leaf springs 4, 5 which extend perpendicular thereto, so that swinging movement in the forward and rearward directions of the wheel supporting arms 6 and 7 can be completely prevented, and accordingly a radius rod in the conventional apparatus becomes unnecessary and the construction of the suspension apparatus becomes simple.

Additionally, the connection between the wheel supporting arms 6, 7 and the leaf springs 4, 5 is effected by means of the swingable links 8, 9, so that there may be provided a movability at that connecting portion. Accordingly, there can be prevented such a possibility that the leaf springs 4 and 5 might be twisted for being restrained in their upward and downward movements by the swinging movements of the wheel supporting arms 6 and 7, and the shock absorbing action thereof can be effected smoothly.

It is, further, preferable that each supporting arm 6, 7 for each wheel 2, 3 be extended to a position near the opposite side wheel 3, 2 and attached swingably to the car body 1 at such position as illustrated in FIGS. 1 and 2. Thereby, the radius of movement of each wheel 2, 3 becomes large and accordingly the degree of inclination of the wheel within the range of up and down movements of the wheel becomes small, so that there is brought about no hindrance even if the supporting arms 6 and 7 are attached to respective attaching housings $2_1$ and $3_1$ of the wheels 2 and 3, there thus being provided the advantage that the connecting construction between the wheel and the supporting arm becomes simple.

We claim:

1. Apparatus for the independent suspension of the wheels of a motor car from the body thereof, the motor car having first and second sets of leaf springs extending longitudinally of the body, said apparatus comprising a wheel supporting arm attached to each wheel and extending transversely of said body, means pivotably attaching each said arm, at an end thereof remote from the associated wheel, to said body such that the wheel is movable up and down, and means coupling each arm to a respective set of leaf springs to cause the latter to flex as the associated wheel moves up and down, the latter means comprising a pivotable connecting link attached to the respective arm and set of leaf springs, said connecting link being connected to said respective arm and set of leaf springs for pivotal movement about axes extending longitudinal of the body.

2. Apparatus as claimed in claim 1, wherein each said link is of annular form and the associated set of leaf springs passes through the center opening thereof.

3. Apparatus as claimed in claim 1, wherein each arm is pivotably attached to the body at a location proximate the other wheel.

4. Apparatus as claimed in claim 1, wherein said means which couples each arm to the respective set of leaf springs comprises a second connecting link, the links straddling the associated arm.

5. Apparatus as claimed in claim 1, wherein said arms are rigidly connected to said wheels.

6. Apparatus as claimed in claim 1, wherein each said link is a flat strap member.

7. Apparatus as claimed in claim 6, wherein each said strap member has opposite ends, one pivotably attached to the associated arm and the other to the associated set of leaf springs.